United States Patent
Morimoto et al.

(10) Patent No.: US 6,651,444 B2
(45) Date of Patent: Nov. 25, 2003

(54) METHOD OF DEFORMING VACUUM HEAT INSULATION MATERIAL, METHOD OF FIXING VACUUM HEAT INSULATION MATERIAL, REFRIGERATION, COLD STORAGE VESSEL, AND HEAT INSULATION BOX BODY

(75) Inventors: Kiyotake Morimoto, Tokyo (JP); Michihiro Oga, Tokyo (JP); Masato Hayashi, Asahi (JP); Junichi Hosaka, Asahi (JP); Reishi Naka, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 274 days.

(21) Appl. No.: 09/914,395

(22) PCT Filed: Dec. 27, 2000

(86) PCT No.: PCT/JP00/09299

§ 371 (c)(1),
(2), (4) Date: Nov. 15, 2001

(87) PCT Pub. No.: WO01/48430

PCT Pub. Date: Jul. 5, 2001

(65) Prior Publication Data

US 2002/0168496 A1 Nov. 14, 2002

(30) Foreign Application Priority Data

Dec. 28, 1999 (JP) .......................................... 11/374954
Jan. 13, 2000 (JP) .......................................... 2000/5072

(51) Int. Cl.$^7$ ................................................ F25B 21/02
(52) U.S. Cl. .......................................... 62/3.3; 62/371
(58) Field of Search .......................... 62/3.2, 3.3, 371, 62/457.9; 264/255, 267

(56) References Cited

U.S. PATENT DOCUMENTS

| | | | | |
|---|---|---|---|---|
| 3,007,596 A | * | 11/1961 | Matsch | 220/560.13 |
| 3,108,840 A | * | 10/1963 | Conrad et al. | 312/400 |
| 5,219,504 A | * | 6/1993 | Insley | 264/116 |
| 6,119,465 A | * | 9/2000 | Mullens et al. | 62/60 |

FOREIGN PATENT DOCUMENTS

JP    2002058604 A    * 2/2002

* cited by examiner

Primary Examiner—Melvin Jones
(74) Attorney, Agent, or Firm—Apex Juris, pllc; Tracy M. Heims

(57) ABSTRACT

A method of easily deforming a plate-shape vacuum insulation material and producing a smaller but highly effective insulation container, comprising steps of inserting a thermoplastic open-celled rigid foam as a core material into a packet composed of gas barrier film, evacuating and sealing the packet so as to produce a vacuum insulation material, heating and softening the vacuum insulation material so as to deform the same, and cooling the vacuum insulation material so as to cure the same, and also a freezing and refrigerating container having Peliter element.

20 Claims, 15 Drawing Sheets

Fig. 1
(1)
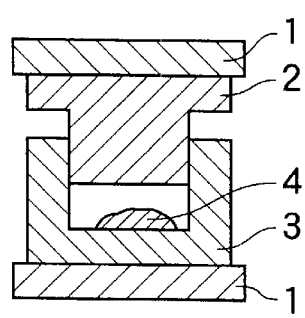
(2)
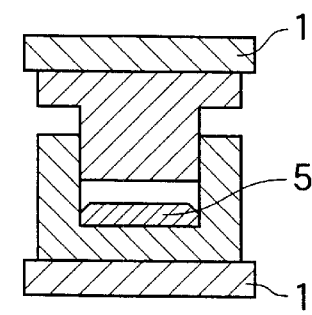
(3)
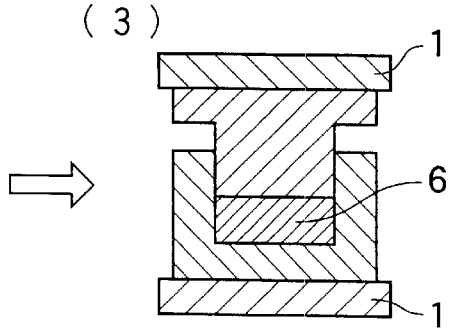
(4)
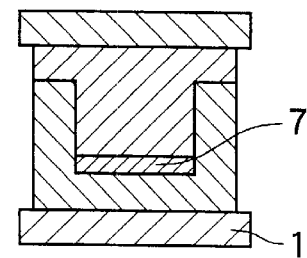

Fig. 2
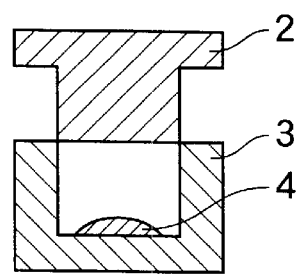
(1)
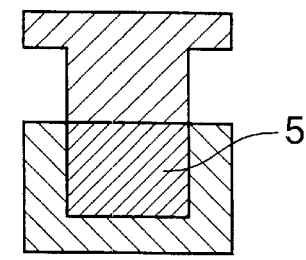
(2)
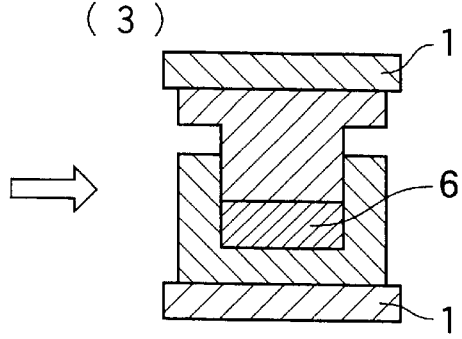
(3)
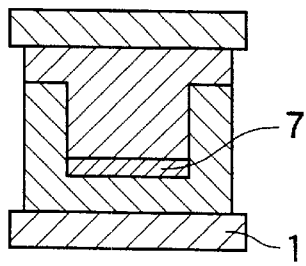
(4)

Fig. 3
(1)  (2)
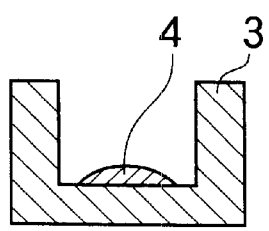  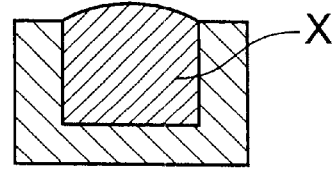

Fig. 4
(a)
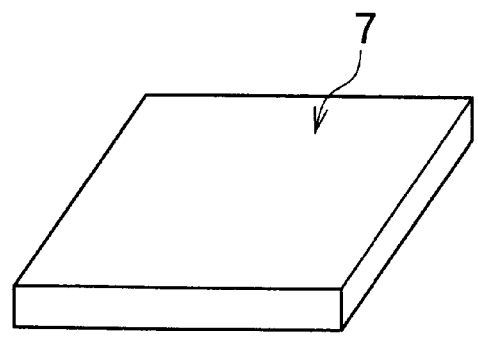
(b)
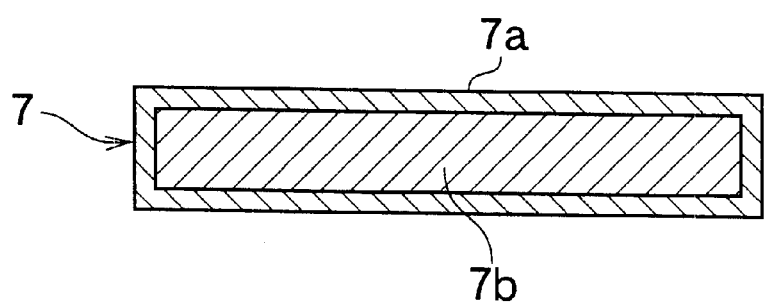

METHOD OF DEFORMING VACUUM HEAT INSULATION MATERIAL, METHOD OF FIXING VACUUM HEAT INSULATION MATERIAL, REFRIGERATION, COLD STORAGE VESSEL, AND HEAT INSULATION BOX BODY

FIELD OF THE INVENTION

The present invention relates to a vacuum insulation material and a thermal insulation container using the vacuum insulation material, comprising an open-celled rigid polyurethane foam as a component, capable of being utilized in various applications such as a freezing and refrigerating apparatus, a freezer, a refrigerated vehicle, a freezing container, a transportation and storage of LNG and LPG, a storage container, a pipe cover, a housing panel, and the like.

BACKGROUND OF THE INVENTION

Recently, aiming at protection of the ozone layer and prevention of the global warming for global environmental protection, there have eagerly been sought use of less or non fluorocarbon and energy saving in various production fields, and hence substitution of some materials has been desired. Among such materials, a thermal insulation material including a rigid polyurethane foam has been one of the targets of such material substitution.

Therefore, various kinds of technologies have been proposed in the thermal insulation material production field, and for example, as a technology for realizing no use of fluorocarbon, there have been a known production method using water as a blowing agent. Further, aiming at energy saving, there have been proposed, for example, a vacuum insulation panel structure prepared by filing a packet composed of a gas barrier material-plastic laminate film with a core material for maintaining a predetermined shape, for example, inorganic powder or an open-celled structure, and sealing the packet under reduced pressure.

Under the circumstance described above, because rigid polyurethane foams comprising open cells have a light weight and exhibit high performance, they are attracting much attention as a thermal insulation material for freezing and refrigerating apparatus, in particular as a core material of the aforementioned vacuum insulation panel, which can contribute to the prevention of global warming.

For example, Japanese Patent Examined publication No. 63-61589, Japanese Patent Unexamined publication No. 6-213561, a seminar report of Japan Thermophysical Property Study Group [Nippon Netsu-bussei kenkyu-kai] (Jun. 30, 1989) and the like have been proposed to obtain high performance vacuum insulation materials with an open-celled rigid polyurethane foam foamed by $CO_2$ from water isocyanate reaction as a core material by using finer cell size or controlling the shape of the cells in the foams.

Although the vacuum insulation material of the conventional art may be utilized for a refrigerator and a cold-box as a simple plate panel, the use of vacuum insulation material does not extend to a cylindrical or spherical objects such as a pipe cover, a thermos bottle, a flange cover, a valve cover, and a vacuum vessel, which however is highly possible.

SUMMARY OF THE INVENTION

<A> It is an object of this invention to facilitate the deformation of vacuum insulation material having an open-celled rigid foam as a core material.

<B> It is another object of this invention to provide an effective freezing and refrigerating apparatus and insulation container utilizing the vacuum insulation material.

This invention relates to: a method of deforming a vacuum insulation material, comprising steps of inserting a thermoplastic open-celled rigid foam as a core material into a packet composed of a gas barrier film, evacuating and sealing the packet so as to produce a vacuum insulation material, heating and softening the vacuum insulation material so as to deform the same, and cooling the vacuum insulation material so as to cure the same; a method of deforming a vacuum insulating material according to the above mentioned, wherein the method further comprises steps of inserting the vacuum insulation material in a heating furnace so as to soften the same, deforming the vacuum insulation material to be positioned in a mold, placing the deformed vacuum insulation material in the furnace, and cooling the deformed vacuum insulation material so as to cure the same.

In the method of deforming a vacuum insulating material according to the above mentioned invention, the method further comprises steps of forming a notched groove on the core material and heating around the notched groove so as to deform the vacuum insulation material.

In the method of deforming a vacuum insulating material according to the above mentioned invention, the open-celled rigid foam is an open-cell rigid polyurethane foam or an open-celled rigid polystyrene foam.

In the method of deforming a vacuum insulating material according to the above mentioned invention, the open-celled rigid foam is an open-cell rigid polyurethane foam and is about 0.55–0.95 in terms of equivalent ratio of NCO/OH.

In the method of deforming a vacuum insulating material according to the above mentioned invention, the open-celled rigid foam is an open-cell rigid polyurethane foam and a means for performing the foam molding comprises the following steps (A)-(C):

(A) steps of mixing foaming components and pouring the foaming components into a chink where said mixed foaming components are produced to freely rise the same;

(B) a step of compressing the foam during the free foaming step of (A) before the gel time, i.e., a first compression step, and (C) a step of compressing the compressed foam obtained in the step of (B) before the rise time, i.e., a second compression step.

In the method of deforming a vacuum insulating material according to the above mentioned invention, said vacuum insulation material is covered by metallic or plastic film.

In the method of deforming a vacuum insulation material according to the above mentioned invention, said vacuum insulation material is dipped into organic polymer solution to be coated thereon.

The method of deforming a vacuum insulation material, comprises steps of forming a notched groove on a surface of the core material of the open-celled rigid foam, inserting the same into a packet composed of a gas barrier film, evacuating and sealing the container so as to produce a vacuum insulation material, and deforming around the notched groove of the core material.

The method of fixing vacuum insulation material, comprises steps of placing a deformed vacuum insulation material on an insulating section of a container, pouring a rigid polyurethane foaming components comprising a polyol component, an isocyanate component, and a blowing agent into a cavity of the insulating section to foam, and fixing the vacuum insulation material on the insulating section.

The freezing and refrigerating apparatus, comprises a vacuum insulation material, obtained through steps of inserting a core material in a packet composed of a gas barrier film and evacuating and sealing the same, and a Peltier element.

The freezing and refrigerating apparatus, comprises a vacuum insulation material, obtained through steps of inserting a core material in a packet composed of a gas barrier film and evacuating and sealing the same, a general vacuum insulation material, and a Peltier element.

A freezing and refrigerating apparatus is described, wherein a deformed vacuum insulation material, obtained through steps of inserting a thermoplastic open-celled rigid foam as a core material into a packet composed of a gas barrier film, evacuating the packet to seal the same, is placed on an insulating section of the container; an insulation material such as a rigid polyurethane foam is inserted into a chink of the insulating section; and a Peltier element is utilized as a cooler.

An insulation container having an insulation material around the containing space is described, wherein said insulation material is a vacuum insulation material in which an open-celled rigid foam formed to a skin layer is covered by a gas barrier film to vacuumize the inside.

In the above-described insulation container, an open-celled rigid foam to a skin is a rigid polyurethane foam obtained by foaming a foaming mixture comprising a polyol component, an isocyanate component, and a blowing agent and has an open cell content of not less than 99% in a state that the obtained skin layer is left as it is.

In the above-described insulation container, the open-celled rigid foam formed to a skin is a rigid polyurethane foam obtained by the steps of compressing a forming components comprising a polyol component, an isocyanate component, and a blowing agent before the gel time and further compressing the same before the rise time.

In the above-described insulation container, the vacuum insulation material is placed in a space between an inner material and an outer material and the rigid polyurethane foam is injected in the remaining space.

In the above-described insulation container, the vacuum insulation material is a deformed vacuum insulation material obtained through deforming a plate vacuum insulation material in conformity with the circumferential surface of the containing space.

An insulation container having an insulation material around the containing space is described, wherein said insulation material is a deformed vacuum insulation material in which an open-celled rigid foam is covered by a gas barrier film to evacuate the inside and said vacuum insulation material is heated to be softened to deform in conformity with the circumferential surface of the containing space and cooled to cure the same.

In the above-described insulation container, the gas barrier film comprises a plastic film and metal or ceramic foil or evaporation of ceramic foil.

The insulation container according the above mentioned invention, wherein a Peltier element is inserted into the insulation container to act as a cooling container to cool the containing space.

A method for manufacturing an insulation container having an insulation material around the containing space is described, wherein said method further comprises steps of freely rising foaming components comprising a polyol component, an isocyanate component, and a blowing agent, compressing said foaming components before the gel time, further compressing the same before the rise time, forming a rigid polyurethane foam having an open cell content of not less than 99% in a state that the obtained skin layer is left as it is, covering the rigid polyurethane foam with a gas barrier film, evacuating the inside to produce the vacuum insulation material, heating and softening the vacuum insulation material to deform the same, and having the cooled and cured vacuum insulation material around the containing space.

A method for manufacturing an insulation container according to the above mentioned is described, wherein said insulation material is heated to be softened to deform and cooled to cure the same.

A method for manufacturing an insulation container having an insulation material around the containing space is described, wherein said insulation material is a deformed vacuum insulation material in which an open-celled rigid foam is covered by a gas barrier film to evacuate the inside and said vacuum insulation material is heated to be softened to deform in conformity with the circumferential surface of the containing space and cooled to cure the same.

A method for manufacturing an insulation container having an insulation material around the containing space is described, wherein said insulation material is a deformed vacuum insulation material in which an open-celled rigid foam is covered by a gas barrier film to evacuate the inside; a notched groove is formed on a core material of the vacuum insulation material in conformity with a shape of the containing space; the core material around the notched groove is deformed in conformity with the circumferential surface of the containing space to obtain the deformed vacuum insulation material; and said deformed vacuum insulation material is positioned around the containing space.

BRIEF DESCRIPTION OF THE DRAWINGS

FIG. 1 is an explanatory view of an example of the manufacturing process in the production method of open-celled rigid foam of this invention.

FIG. 2 is an explanatory view of another example of the production steps in the production method of open-celled rigid foam of this invention.

FIG. 3 is an explanatory views of the production steps in the production method of the freely risen foam without any compression step using the foaming components of the open-celled rigid polyurethane foam of the present invention.

FIG. 4 is an explanatory view of an example of the open-celled rigid foam. (a) is a perspective view, and (b) is a cross-sectional view thereof.

DETAILED DESCRIPTION OF THE INVENTION

Figure 5:
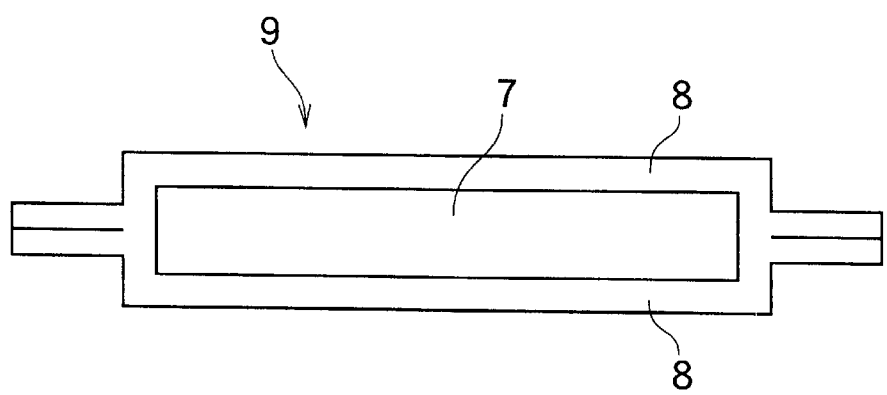
FIG. 5 is a cross section view of an example of a vacuum insulation material.

Embodiments of the present invention will be explained in detail hereinafter.

<A> Open-celled Rigid Foam

An open-celled rigid foam is a rigid foam having open-celled structure such as an open-celled rigid polyurethane foam and an open-celled rigid polystyrene foam. For instance, the open-celled rigid polyurethane foam may be produced by foam molding of foaming components comprising a polyol component, an isocyanate component, and a blowing agent.

Preferably, the open-celled rigid polyurethane foam used in this invention has about 0.55–0.95 content ratio of the polyol component and the isocyanate component in terms of equivalent ratio of NCO/OH so that the rigid polyurethane foam becomes thermoplasticizeable.

Further, the cell of the rigid polyurethane foam utilized in this invention has a fiber piled structure, for example, like a laminate of non-woven fabric, thereby facilitating a curve deformation. As a method for producing the rigid polyurethane foam having the cells, the rigid polyurethane foam is preferably produced by compression molding in which compression is carried out during the foaming of the rigid polyurethane foam. The compression molding allows all the open cells throughout the foam including from the inside to the skin layer portions to take the flattened form.

Normally, the rigid polyurethane foam forms a skin layer when foamed. Since the cells of the skin layer are not open, the skin needs to be removed. Such normal rigid polyurethane foam may be used in the present invention. However, in terms of energy saving etc., the open-celled rigid polyurethane foam of the present invention preferably has an open cell content of not less than 99% in a state that a skin layer is left on the foam so as to avoid any waste during the production.

The term "skin layer" of the foam, as used in this specification, refers to a surface portion or surface layer of the foam.

The open cell content can be calculated according to the equation: 100-Cr where Cr is a closed cell content determined according to ASTM-D1940. The density of the open-celled rigid polyurethane foam of the present invention having open cells in a state that a skin layer is left on the foam can be suitably selected depending on the use of the foam, and it is not particularly limited. However, when the foam is used as a core material of a vacuum insulation material for example, the density is preferably in the range of about 90–180 kg/m$^3$, more preferably in the range of about 100–150 kg/m$^3$.

The density distribution of the open-celled rigid polyurethane foam of the present invention having open cells in a state that a skin layer is left on the foam is also not particularly limited like the density of the foam as a whole. However, it is preferred that the density of the surface layer constituting a portion of 0.5 mm thickness from the surface toward the inside of the foam should be close to the density of the core portion constituting a portion of the foam other than the surface layer. Specifically, the density of the surface layer is preferably about 0.9–1.5 times as high as that of the core portion, and more preferably about 1.0–1.3 times as high as that of the core portion.

Hereinafter, the term "surface layer" refers to a surface layer constituting a portion of 0.5 mm thickness from the surface toward the inside of the foam, and "core portion" refers to a core portion constituting a portion of the foam other than the surface layer, unless otherwise indicated.

<B> Production of Open-celled Rigid Polyurethane Foam

A method for producing an open-celled rigid polyurethane foam of the present invention having open cells in a state that a skin layer is left on the foam will be explained in the following section. The open-celled rigid polyurethane foam can be produced by mixing a blowing agent, a polyol component and an isocyanate component to cause foaming. As a specific production method of the present invention, there can be mentioned the method of the present invention comprising a step of foam molding foaming components containing a polyol component, an isocyanate component, and a blowing agent, wherein a content ratio of the polyol component and the isocyanate component is about 0.55–0.95 in terms of equivalent ratio of NCO/OH.

The content ratio of the polyol component and the isocyanate component is selected to be within a range of about 0.55–0.95 in terms of equivalent ratio of NCO/OH, and thereby enabling the production of an open-celled rigid polyurethane foam of the present invention having an open cell content of not less than 99% throughout the foam in a state that the skin layer is left on only by mixing the aforementioned materials to cause foaming, that is, without removing the skin layer after the foam molding like in the conventional methods. This advantage can be obtained because the equivalent ratio of NCO/OH in the aforementioned range disturbs the balance of elongation and strength of the skeletal resin forming the cells, and therefore the cells can be sufficiently broken throughout the foam from the inside to the skin layer.

Here, the formulating ratio of the polyol component and the isocyanate component in foaming components for conventional open-celled rigid polyurethane foams is selected to be 1–1.2 in terms of equivalent ratio of NCO/OH considering the compression strength of open-celled rigid polyurethane foams obtained after the removal of the skin layer. For example, as described in Japanese Patent Unexamined Publication No. 6–213561, when a foam having a free foaming density of 20 kg/m$^3$ is produced by using water as the blowing agent, the polyol component (A) and the isocyanate component (B) are used in a ratio B/A (weight ratio) of 1.5–2.0, that is, a large amount of the isocyanate component is used. Therefore, the curing property is degraded, friability is increased as a whole, and durability becomes insufficient. Thus, good foams could not have been obtained.

In contrast, by using an equivalent ratio of NCO/OH of about 0.55–0.95 in the foaming components, which is lower than that conventionally used, the problem of increased friability can be solved, and the cells can be sufficiently broken from the inside to the skin layer to afford an open-celled rigid polyurethane foam having an open cell content of not less than 99% throughout the foam, more specifically, an open cell content of not less than 99% as for both of the surface layer and the core portion in a state that the skin layer is left as it is.

Unlike the production method of the conventional arts, the present invention can provide a smooth surface and may be adapted to various kinds of shapes, because the skin layer is not required to be removed in order to secure the open cell content. In addition, the method of the present invention results in no waste during the production, and therefore it is a gentle system for the global environment, which can also sufficiently meet the future recycling.

The polyol component used in the method for producing the open-celled rigid polyurethane foam is not particularly limited, and polyol components commonly used in foaming components for polyurethane foam can be employed. Specifically, polypropylene glycols, polytetramethylene glycols, polyether polyols such as modified versions of these glycols including tolylenediamine polyethers, sucrose polyethers, ethylenediamine polyethers, and the like; polyester polyols such as condensed polyester polyols, lactone polyester polyols, polycarbonate polyester polyols; polybutadiene polyols; acrylic polyols; partially saponified ethylene-vinyl acetate copolymers; phenolic polyols and the like can be exemplified.

The isocyanate component is not particularly limited and isocyanate components commonly used in foaming components for polyurethane foams can be employed. Specifically, polymeric 4, 4'-diphenylmethane diisocyanate (polymeric MDI or crude MDI), carbodiimide modified MDI, tolylene diisocyanate and the like can be exemplified.

Most of such ordinary polyol components and isocyanate components conventionally used as foaming components for polyurethane foams are commercially available, and such commercial products can be used for the present invention.

As the blowing agent used for the present invention, HFC, HCFC, cyclopentane, water and the like can be exemplified. While one or more of these can appropriately be selected, it is preferred to use water according to the present invention, since it exhibits ODP (ozone depletion potential)=0, and GWP (global warming potential) is approximately 0 and is highly safe without any risk of explosion and fire.

The foaming components for open-celled rigid polyurethane foam used for the production method of the present invention can include, in addition to the aforementioned components, various kinds of components used in the ordinary production methods of polyurethane foams, such as a catalyst, chain extender, crosslinking agent, foam stabilizer, cell opener, filler, plasticizer, flame retardant and the like.

As the catalyst, organometallic catalysts, amine compound catalysts such as tertiary amines and amine salts, and the like can be mentioned. As the chain extender or the crosslinking agent, glycols can be specifically mentioned. As the foam stabilizer, various kinds of surfactants, preferably silicone surfactants can be specifically mentioned. Further, barium stearate and calcium stearate are preferred as the cell opener, and inorganic powder such as mica and calcium carbonate and metal powder are exemplified as the filler.

The foaming components of the open-celled rigid polyurethane foam of the present invention contain the polyol component, the isocyanate component, the blowing agent, and other components. The content ratio of the polyol component and isocyanate component in the foaming components is in the range of about 0.55–0.95, preferably in the range of about 0.60–0.80 in terms of the equivalent ratio of NCO/OH.

If the equivalent ratio of NCO/OH is less than 0.55, the mechanical strength is extremely decreased, and the foam becomes likely to shrink. If the equivalent ratio of NCO/OH is more than 0.95, the cells become larger, and it becomes difficult to form open cells in the skin layer.

With regard to the amount of the blowing agent used, the amount conventionally used in the production of polyurethane foam is applicable. For example, when water is used as the blowing agent, it can be used in an amount of 4–8% by weight relative to the content of the polyol component in the foaming components. With regard to the other ingredients formulated in the foaming components, they can be used in the same amounts as commonly used for the production of conventional polyurethane foams.

<C> Multi-stage Compression Molding

The open-cell rigid polyurethane foam having open-cells in a state that a skin layer is left on the foam may be produced by the compression molding during free foaming. The compression molding is preferably the multiple-stage compression molding. The open-celled rigid polyurethane foam of the present invention prepared by the multiple-stage compression molding would have open cells in a crushed shape throughout the foam from the inside portion to the skin layer, and have a resin structure of "fiber piled" structure, for example, like a laminate of non-woven fabric.

As a specific example of the method of the multiple-stage compression molding in the production method of the present invention, the molding process including the following steps (A)-(C) can be mentioned:

(A) steps of mixing foaming components, pouring the same into the chink where the mixed foaming components are to be formed, and freely foaming the same.

(B) the first compression step of compressing the freely rising foam which is freely rising in the step (A) before its gel time (hereinafter the first compression).

(C) the second compression step of further compressing the compressed foam obtained in the step (B) before its rise time (hereinafter the second compression).

In the production method of the open-celled rigid polyurethane foam, the content ratio of the polyol component and the isocyanate component in the mixture of foaming components is selected to be within a range of about 0.55–0.95 in terms of equivalent ratio of NCO/OH. Therefore, the open-celled rigid polyurethane foam can be obtained only by mixing the aforementioned materials to cause foaming, that is, without removing the skin layer after the foam molding like in the conventional methods. There, the foaming components of the open-celled rigid polyurethane foam of the present invention contain the polyol component, the isocyanate component, the blowing agent, and other ingredients such as those mentioned above, and the content ratio of the polyol component and isocyanate component in the foaming components is in the range of about 0.55–0.95, preferably in the range of about 0.60–0.80 in terms of the equivalent ratio of NCO/OH.

If the equivalent ratio of NCO/OH is less than 0.55, the mechanical strength is extremely decreased, and the foam becomes likely to shrink. If the equivalent ratio of NCO/OH is more than 0.95, the cells become larger, and it tends to become difficult to form open cells in the skin layer.

The amount of the blowing agent used in the production method of the present invention may be the same as that of the blowing agent used in the production of conventional polyurethane foam. With regard to the other ingredients formulated in the foaming components, they can be used in the same amounts as commonly used for the production of conventional polyurethane foam.

In the production method of the present invention, the foaming components is prepared in the same manner as in the production of conventional polyurethane foams, for example, by means of a high pressure foaming machine.

A method of foam molding in the production method of the present invention is compression molding, and a molding process includes the above-mentioned steps (A)-(C).

That is, the step (A) is to mix foaming components, pour the same into the chink where the mixed foaming components are formed, and to freely foam the same, the first compression step (B) is to compress the freely rising foam which is freely rising in the step (A) before its gel time, and the second compression step (C) is to further compress the compressed foam obtained in the step (B) before its rise time.

The similar or same mold used in the conventional polyurethane foam may be used as the cavity of the present invention; it preferably is a mold which enables the compression in the following (B) and (C), for example, a metallic mold or a resin mold consisting of an upper mold and a lower mold.

As a specific example of the compressing in the aforementioned steps (B) and (C), with regard to the first compression in the step (B), such a degree volume of the compressed foam obtained is 40–80%, more preferably 40–60%, of that of the freely risen foam without any compression in the step (A). The abovementioned volume of the freely risen foam without any compression in the step (A) means, for example, the volume of the degree that a step foam which is obtained by allowing the mixture of foaming components foams freely till rise time in a vessel having an open top, that is, without having any restrictions from above, and cures it.

As a specific example of the second compressing in the aforementioned steps (C), the compressed foam may be obtained therein, i.e., a degree volume of the open-celled rigid polyurethane foam is preferably 10–30%, more preferably 20–30%, of that of the freely risen foam without any compression in the step (A). Furthermore, for the better open cell content, the second compression step of (C) may preferably be carried out before its rise time, more preferably immediately after outgassing.

The compression in the first compression step as set in the step (B) means a volume of 40–80% of that of the freely risen foam without any compression in the step (A). The compression methods include, for example, before its gel time, a method compressing the freely rising foam expanded due to the foaming into about 40–80% of the volume of the freely rising foam without any compression in the step (A) by way of, for example, forcing, and a method fixing such as the metal mold in a predetermined position so as to restrict the volume of about 40–80% of that of the freely risen foam without any compression in the step (A). In the present invention, the compression in the first compression step is carried out by restricting the expansion of the freely rising foam.

The first compressing in the step (B) and the second compressing in the step (C) may be completely performed by a single compressing operation or a plurality of compressing operations, respectively. The second compression is preferably performed in the same direction as the first compression because in this manner it is easy to form the fiber piled structure in the foam.

The open-celled rigid polyurethane foam of the present invention prepared would have open cells in a crushed shape throughout the foam from the inside portion to the skin layer, and have a resin structure of "fiber piled" structure, for example, like a laminate of non-woven fabric.

The second compression step is performed to the compressed foam, the gel time of which has progressed and the resin strength of which has appeared and which has the uniform density from the surface layer to the core portion, immediately after the outgassing. Thus, the cells can be completely broken and opened with each other throughout the foam from the inside to the skin layer by the crushing effect in the second compression step. That is, the foam having an open cell content of not less than 99% throughout the foam including the skin layer can be obtained by performing the multiple-stage compression at the abovementioned timing.

The terms "gel time", "outgassing", and "rise time", as used in the present specification, are defined respectively as follows. Namely, in the foam molding step, "gel time" refers a time when the foaming mixture begins to make a string by a glass rod which is stuck into the foam and then pulled out of it, "Outgassing" refers to a time when a gas being discharged from foam surface, and "rise time" refers a time when the foam expansion ceases. Further, "cream time" refers a time when a liquid foaming mixture starts foaming after the foaming components are mixed during the foam molding.

The molding process comprising the aforementioned steps (A)-(C) will be explained in more detail referring to the schematic explanatory views shown in FIGS. 1(1)-(3) and comparing with the schematic explanatory views in the method for producing the freely risen foam without any compression step shown in FIG. 3(1)-(2).

FIG. 1(1) and FIG. 1(2) are schematic explanatory views of the aforementioned step (A). FIG. 1(1) shows a foaming component mixture 4 obtained by sufficiently mixing the aforementioned components and pouring into a chink formed between an upper mold 2 and a lower mold 3 of a metallic mold. FIG. 1(2) shows the freely rising foam 5 obtained by the free foaming of the foaming component mixture 4 poured in the above FIG. 1(1), which fills the cavity between the upper mold 2 and the lower mold 3. Further, the upper mold 2 of FIG. 1(1) shows a condition where the upper mold 2 is fixed in a predetermined position since the first compression in the aforementioned step (B) is carried out by restricting the expansion of the freely rising foam. A material and a shape of the mold used herein may be selected as required. The metal mold may be warmed as required.

Comparing to the above, in FIG. 3(1), it shows that the only lower mold 3 is used as a metallic mold to produce the freely risen foam and the same foaming component mixture 4 as used in FIG. 1(1) is poured into the lower mold 3 in the same amount as in FIG. 1(1). FIG. 3(2) shows the freely risen foam X obtained by freely foaming the foaming component mixture poured into the lower mold 3 in the above FIG. 3(1) until rise time without any restrictions from above and continuously curing in the lower mold 3.

FIG. 1(3) is a schematic explanatory view of the step (B), which shows a condition that the expansion of the freely rising foam is restricted (i.e., the first compression step) to obtain the compressed foam 6 by fixing the upper mold 2 in the predetermined position before the expansion due to foaming of the freely rising foam. In order to restrict the expansion of the freely rising foam, the upper mold 2 is fixed in the predetermined position, where the obtained compressed foam 6 has a volume of 40–80% of the freely risen foam X without any compression shown in FIG. 3(2). The expansion of the freely rising foam may be restricted by the upper mold before the gel time of the freely rising foam obtained in the step (A). Preferably, it is about 5–10 seconds before the gel time. The gel time and the volume of the freely rising foam obtained may be measured beforehand by performing a preliminary experiment under a condition similar to the production condition, since it varies depending on the nature of the foaming mixture, mold temperature, and the like.

FIG. 1(4) is a schematic explanatory view of the step (C), which shows an open-celled rigid polyurethane foam 7 which is obtained through further compression of the compressed foam 6 by further pushing in the upper mold 2 with the press 1 (the second compression). It is preferable that the compression in the step (C) is performed so that the obtained compressed foam 7 has a volume of 10–30% of the aforementioned freely risen foam X without any compression shown in FIG. 3(2). Although the timing of the second compression by the press 1 is not particularly limited so long as it is performed before the rise time, it is preferably performed immediately after the outgassing time. The outgassing time and the rise time are also preferably determined beforehand by a preliminary experiment or the like, similar to the gel time.

As a specific example of the first compressing in the aforementioned step (B), FIG. 2 shows when the compression is performed by pressing the freely risen foam expanded due to the foaming, such a degree volume of the freely risen foam is about 40–80% of that of the freely risen foam without any compression in the step (A).

FIG. 2(1) and FIG. 2(2) are schematic explanatory views of the aforementioned step (A). FIG. 2(1) shows a foaming component mixture 4 obtained by sufficiently mixing the aforementioned components and poured into the cavity formed between an upper mold 2 and a lower mold 3 of a metallic mold. FIG. 2(2) shows the freely rising foam 5 obtained by the free foaming of the foaming component mixture 4 poured in the above (1), which fills the cavity between the upper mold 2 and the lower mold 3. A material and a shape of the mold used herein may be selected as required. The metal mold may be warmed as required.

FIG. 2(3) is a schematic explanatory view of the step (B), which shows the condition that the press 1 gradually pushes the upper mold 2 so that the degree volume of the freely risen foam becomes about 40–80% of that of the freely risen foam without any compression in the step (A), thereby compressing the aforementioned freely risen foam 5 (i.e., the first compression) to obtain the compressed foam 6. The first compression using the press 1 is carried out before its gel time. Although the timing of the first compression is not particularly limited so long as it is performed before the gel time, it is preferably performed about 5–10 seconds before the gel time. FIG. 2(4) is same as the aforementioned FIG. 1(4).

FIG. 4 shows an example of manufacturing method for the open-celled rigid polyurethane foam, FIG. 4(a) is its outside isometric view, and FIG. 4(b) is its cross-section view. The open-celled rigid polyurethane foam 7 shown in FIG. 4 is the open-celled rigid polyurethane foam of the present invention having a surface layer density of about 0.9–1.5 times as high as that of the core portion. In the open-celled rigid polyurethane foam shown in FIG. 4(b), the surface layer 7a constituting a portion of 0.5 mm thickness from the surface toward the inside of the foam and a core portion 7b have an open cell content of not less than 99%. The density of the surface layer 7a is about 0.9–1.5 times of that of the core portion 7b.

Preferably, the production method of the present invention further includes a step of giving the foam obtained in the foam molding to a baking treatment by means of far-infrared ray exposure.

The aforementioned open-celled rigid polyurethane foam of the present invention can be used, for example, as a thermal insulation material. Specifically, the heat insulation material of the present invention can be used inside of walls of appliance requiring heat insulation characteristic. For example, it is placed in a space formed between an outer case and an inner case of a refrigerating or freezing apparatus or the like.

The open-celled rigid polyurethane foam obtained through the production method of the present invention may have excellent strength and smooth surface, and thus the heat insulation material utilizing it will have excellent strength and a smooth surface, thereby improving appearance and providing high quality products.

The production method of a vacuum insulation material of this invention is characterized in that the open-celled rigid polyurethane foam is inserted into a container composed of a gas barrier film so that the whole foam is covered with the container, reducing internal pressure of the container, and sealing the container to provide a vacuum insulation material.

Although the shape of the container used for the production method of the vacuum insulation material of the present invention is not particularly limited, a bag shape is preferred considering durability of gas barrier films with various structures when evacuating. Further, inside of the container is preferably evacuated to about $133 \times 10^{-1}$–$10^{-3}$ Pa($1 \times 10^{-1}$–$10^{-3}$ torr). The expression "evacuating inside of container" specifically means to evacuate all of cavities including a cavity inside the open-celled rigid polyurethane foam inserted into the container and a cavity between the container and the foam.

As the gas barrier film constituting the container used for the present invention, materials conventionally used as gas barrier films for vacuum insulation materials can be used without particular limitation. Specifically, metal-plastic laminate films can be mentioned. More specifically, three-layer laminate films of polyurethane terephtalate film/aluminum foil/high density polyethylene film can be exemplified. When a laminate film of such three-layer structure is used for the present invention, the high density polyethylene film should be inside the container.

As a similar laminate film, there are films using a stainless steel foil instead of the aluminum foil. These films are effective for avoiding heat bridging because of the small thermal conductivity thereof. If a technique for producing a further thinner stainless steel foil is established, heat insulation of higher grade can be expected. An acrylonitrile film, vinyl acetate copolymer film or the like can also be used instead of the polyethylene terephthalate film or the high density polyethylene film.

In the production method of the vacuum insulation material, the sealing of the evacuated container is obtained by heat sealing of the gas barrier film or the like. When the sealing is obtained by means of heat sealing, a portion of the film to be heat-sealed preferably consists of a high density polyethylene film. This is because the high density polyethylene film is more excellent in a heat sealing property than acrylonitrile film and therefore affords highly reliable gas barrier property after sealing.

The vacuum insulation materials produced by the method of the present invention can afford good appearance of the products utilizing them since the open-celled rigid polyurethane foam used as the core material is prepared without removing the skin layer and hence has a smooth core surface. By processing the metallic mold used for the production of the core material to have a grain pattern or the like, the design of the product can be improved without any additional processing. Further, by using the aforementioned open-celled rigid polyurethane foam of the present invention, which is optionally subjected to baking treatment with far-infrared ray exposure as required, quality of the products can be improved, for example, excellent mechanical strength can be obtained. Therefore, it can be widely used not only in the field of freezing and refrigerating equipment, but also for various applications such as freezers, storage containers, pipe covers, housing and the like.

The getter agent can be used in order to improve safety as for intrusion of external gases or dispersion of adsorbed gases from the foam.

The open-celled rigid polyurethane foam has a low heat deformation temperature because the NCO/OH equivalent ratio of the foaming components used for the production is about 0.55–0.95. In addition, a small Young's modulus in flexure and good follow-up ability to deformation because it has the piled fiber-like resin structure as mentioned above. Heating temperature is set in relation to heating time. Preferably, the temperature is such that the core material is sufficiently soften for a desirable deformation and is in the range of 80–170° C., more preferably 100–140° C. For instance, a vacuum insulation material in a plate shape using the aforementioned foam can be heat-treated for several minutes and then formed into the vacuum insulation material of various shapes, for example, a plate shape or shape having curvature such as a cylindrical shape. The core material is the open-celled rigid polystyrene foam has a lower softening point than the open-celled rigid polyurethane foam preferably within the range of 90–120° C.

<D> Deformation of Vacuum Insulation Material

The vacuum insulation material, for example, the plate-shape vacuum insulation material, can be heat-treated to easily deform so as to obtain the vacuum insulation material having curvature. The deformed vacuum insulation material may be formed into a wide variety of shapes, for example, a cylindrical shape or a box shape, thereby providing wide applications with heat insulation of higher grade. Both ends of the core material are subject to siding to form a trapezoid-shape so as to facilitate the panel connection. With regard to the deformed vacuum insulation material, its internal or external layer may be covered with a metal or a plastic film for the purpose of surface protection or improved gas barrier, and the vacuum insulation material may be dipped into organic polymer solution to be coated to form a polymer film, thereby providing a vacuum insulation material with higher added value. Further, improvement in the resulted processing and lowering the cost will be expected.

An example of the production steps for an open-celled rigid polyurethane foam of the present invention will be explained below.

<A> Production Steps

Open-celled rigid polyurethane foams of these examples in the present invention were prepared according to the production steps shown in FIG. 1. Further, for comparison, freely risen rigid polyurethane foam without any compression was prepared according to the production steps shown in FIG. 3(1)-(2).

The foaming component mixture 4 shown in FIG. 1(1) was prepared by mixing the following components using a high-pressure foaming machine; 100 parts by weight of a mixture of 300 mg KOH/g of tolylenediamine polyether, 450 mg KOH/g of sucrose polyether and 500 mg KOH/g of ethylenediamine polyether in a ratio of 5:3:2 as a polyol component; 6 parts by weight of water as a blowing agent; 1.0 part by weight of foam stabilizer ("SZ-1919", trade name of Nippon Unicar); 0.5 part by weight of catalyst ("Kaolizer No. 31", trade name of Kao); 4 parts by weight of barium stearate as a cell opener; and 132 parts by weight (NCO/OH equivalent ratio 0.7) of crude MDI "44V-20" (trade name of Sumitomo Bayer Urethane) as an isocyanate component.

As shown in FIG. 3(1), the same foaming component material 4 as that used in the above-production process was poured into a lower mold 3 of aluminum mold in a state that an upper mold 2 (not shown) was pulled up satisfactorily. Then, the foaming material was allowed to foam freely till rise time and to cure completely to obtain a freely risen rigid polyurethane foam X which is shown in FIG. 3(2). During the above step, the gel time, the outgassing time, and the rise time were measured. Further, the density of the obtained freely risen foam X utilizing the foaming component mixture of this production process was measured as 25 kg/m$^3$.

As in FIG. 1(1), a foaming component mixture 4 is poured into a chink formed between an upper mold 2 and a lower mold 3 of an aluminum mold. The upper mold 2 preferably has a volume of 60% of the aforementioned freely risen foam X without any compression which is shown in FIG. 3(2).

As shown in FIG. 1(2), the foaming component mixture poured in FIG. 1(1) was freely foamed in a cavity formed between an upper mold 2 and a lower mold 3. The freely risen foam 5 contacts the upper mold 2 when freely foamed, and the further foaming restricts foaming of the freely risen foam 5 as in the step (B), thereby obtaining the compressed foam 6 having a volume of 60% of the foam X. The timing of the freely risen foam 5 contacting the upper mold 2 or the timing of the freely risen foam 5 being restricted by the upper mold 2 is preferably about 5–10 seconds before the gel time. As shown in FIG. 1(4), immediately after outgassing, an open-celled rigid polyurethane foam 7, which has a volume of 25% of the freely risen foam X without any compression as shown in FIG. 3(2), was obtained through further compression of the compressed foam 6 by further pushing in the upper mold 2 with the press 1 (the step C). Here, the mold temperature was adjusted to be in the range of 50–55° C. in FIG. 1(1) and FIG. 1(2).

FIGS. 4a and 4b show schematic views of an exemplary open-celled rigid polyurethane foam 7 after the release from the metallic mold, and FIG. 4(a) is an outside isometric view while FIG. 4(b) is its cross-section view. Open cell content and density of the surface layer 7a, which constituted a portion of 0.5 mm thickness from the surface toward the inside of the open-celled rigid polyurethane foam 7, and the core portion 7b as shown in FIG. 4(b) were measured. The results are shown in Table 1. As a reference purpose, FIG. 1 shows the result that the compressed foam 6 was removed from the mold, and open cell content of a surface layer constituting a portion of 0.5 mm thickness from the surface toward the inside of the foam and the core portion constituting the other portion of the foam were measured in the aforementioned production procedure The open cell content was calculated by measuring a closed cell content (Cr) according to ASTM-D1940, and subtracting the resulting value from 100 as mentioned above. It was evaluated according to the following criteria.

Open cell content of not less than 99%=⊙: open cell content of not less than 90% and less than 99%=○: Open cell content of less than 90%=×.

|  |  |  |  | Example 1 |
|---|---|---|---|---|
|  | Equivalent Ratio of NCO/HO |  |  | 0.8 |
| Open Cell | Compression | First | Core Portion | ⊙ |
| Content | Molding |  | Surface Layer | ○ |
|  |  | Second | Core Portion | ⊙ |
|  |  |  | Surface Layer | ⊙ |

-continued

|  |  | Example 1 |
|---|---|---|
| Density (kg/m³) | Core Portion | 131 |
|  | Surface Layer | 148 |
|  | Overall | 138 |
|  | Surface Layer/ Core Portion | 1.13 |

<B> Vacuum Packaging Method

A foam is covered with a packet composed of a gas barrier film reducing internal pressure of the packet up to 1.33 Pa (0.01 torr) and to seal the packet, thereby resulting in the vacuum insulation material 9 of FIG. 5. In case that the getter was contained, 10 g of the getter was put between the molded form 7 and the packet 8 when covering the molded foam with the packet, and the packet was evacuated and sealed likewise to obtain a vacuum insulation material containing the getter.

In FIG. 5, the packet 8 is composed of a laminate of a polyethylene terephthalate film, aluminum foil and high density polyethylene film laminated in this order from the outside. Although a container produced by vacuum molding can be used instead of the packet, the packet is preferred because the container is likely to lose its gas barrier property when the aluminum foil is broken during the vacuum molding.

As explained above, use of the open-celled rigid polyurethane foam obtained through the production method in the present invention as thermal insulation materials or vacuum insulation materials is effective for global environmental protection, because it results in no waste upon production. As an example of the production process, by using water as a blowing agent as in the above examples, non-fluorocarbon production can be achieved, and this may contribute to the ozone layer protection, prevention of global warming and the like.

By producing this vacuum insulation material in a continuous production line, thermal insulation materials can be produced with high quality and low cost. Therefore, it becomes possible to provide thermal insulation materials effective for protection of the ozone layer, prevention of the global warming and the like at a low cost, and this can contribute to the society.

Deformation Process of Vacuum Insulation Material

Figure 6:
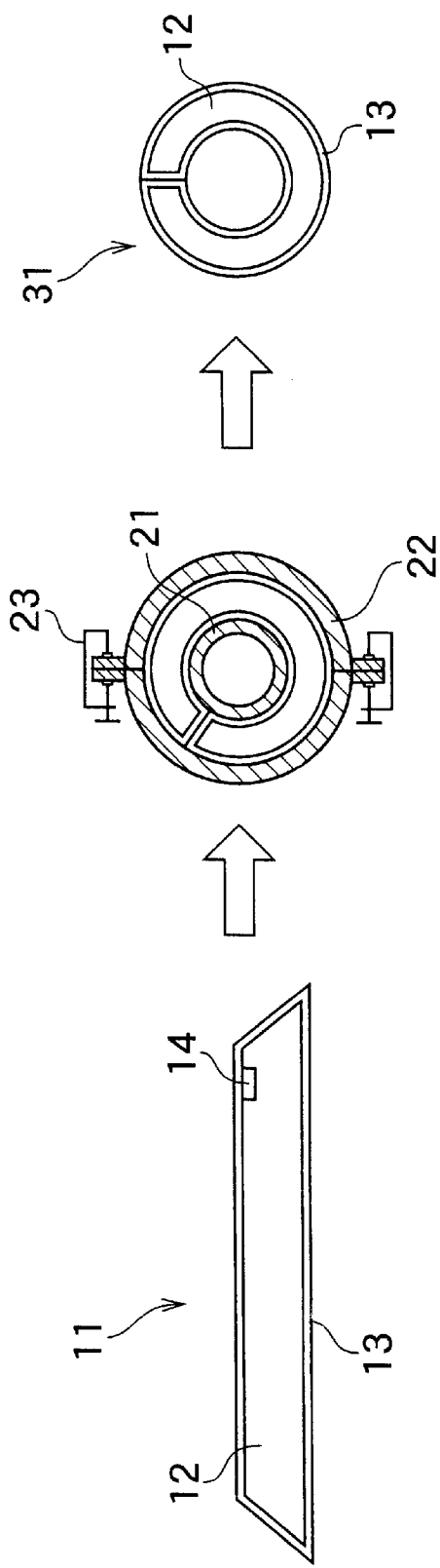
FIG. 6 is an explanatory view of an example of deformation shape for a cylindrical vacuum insulation material.

FIG. 6 illustrates a process of deforming a plate-shape vacuum insulation material into a cylindrical shape. The plate-shape vacuum insulation material 11 is covered with a packet composed of the gas barrier film 13 having the open-celled rigid polyurethane foam as the core material 12, into which the getter 14 is introduced. Here, both ends are shaped trapezoid to facilitate the connection. This plate-shape vacuum insulation material 11 is placed in a heating furnace to be heat treated at 100–140° C. for 10–20 minutes. Then, the softened plate-shape vacuum insulation material 11 is inserted between a cylindrical inner mold 21 and an outer mold 22 to be forcibly deformed and is fixed by a clamp 23. While being fixed by the clamp 23, the plate-shape vacuum insulation material 11 is placed in a heating furnace again to be heat treated at 100–140° C. for 10–20 minutes. Then, it is cooled at 5–10° C. for 30–60 minutes and is removed from the mold. Accordingly, a cylindrically deformed vacuum insulation material 31 is resulted.

Figure 7:
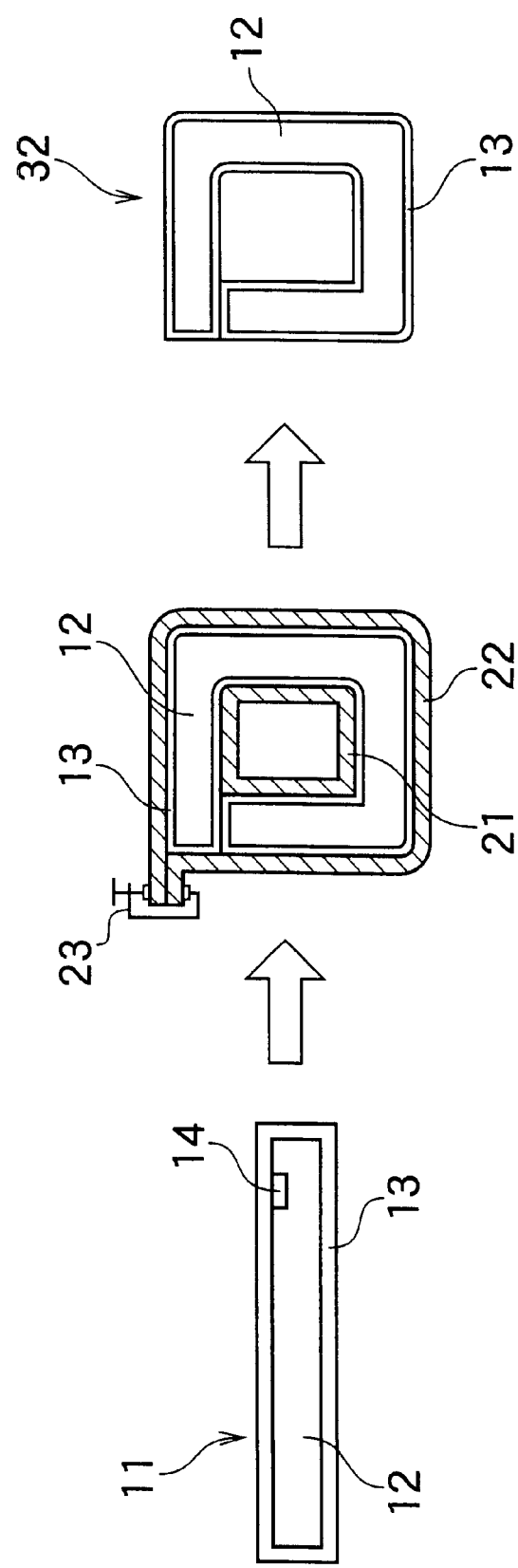
FIG. 7 is an explanatory view of an example of deformation steps for a box-shape vacuum insulation material.

FIG. 7 shows a method of deforming a plate-shape vacuum insulation material into a box-shape. The plate-shape vacuum insulation material 11 is placed in a heating furnace to be heat treated at 100–140° C. for 10–20 minutes. Then, the softened plate-shape vacuum insulation material 11 is inserted between a cylindrical inner mold 21 and an outer mold 22 to be forcibly deformed and is fixed by a clamp 23. This plate-shape vacuum insulation material 11 is placed in a heating furnace to be heat treated again at 100–140° C. for 10–20 minutes. Then, it is cooled at 5–10° C. for 30–60 minutes and is removed from the mold. Accordingly, an insulation material 32 deformed in a box-shape is resulted.

Figure 8:
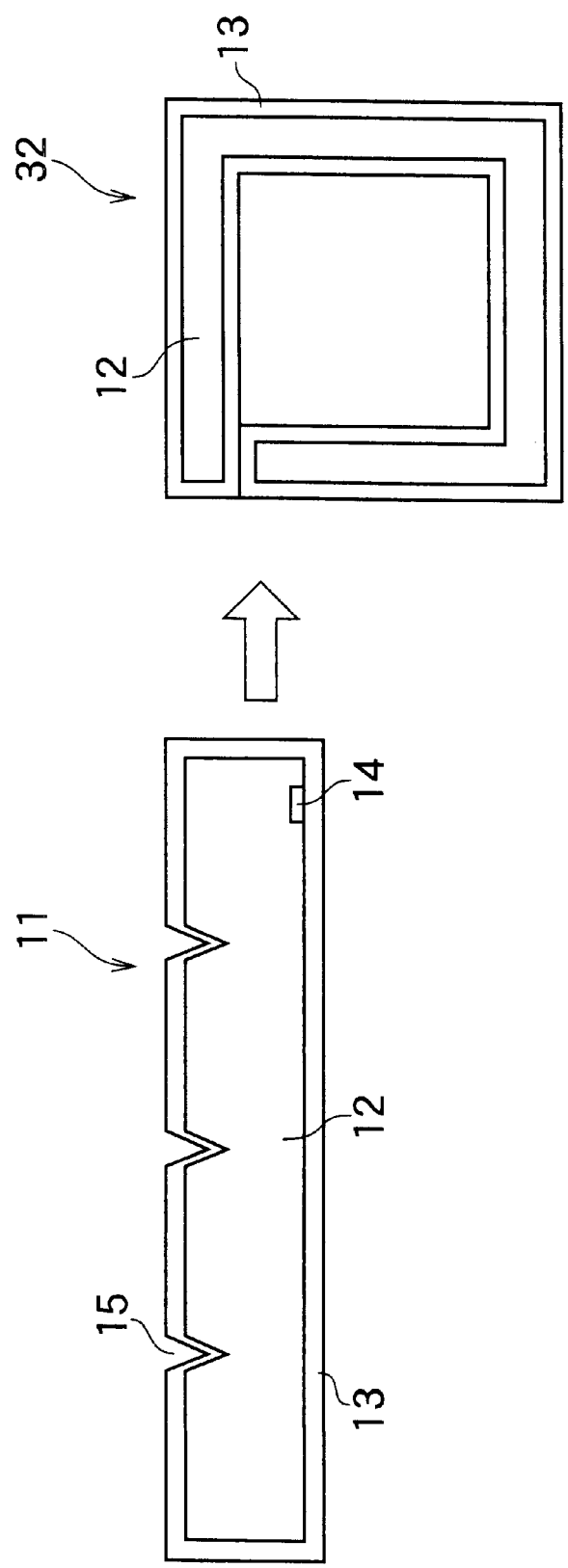
FIG. 8 is another explanatory view of an example of deformation steps for a box-shape vacuum insulation material.

FIG. 8 shows a method of deforming a plate-shape vacuum insulation material 11 having a notched groove 15 into a box-shape. This plate-shape vacuum insulation material 11 as a whole is placed in a heating furnace to be heat treated at 100–140° C. for 10–20 minutes. Further, a portion around the notched groove 15 of the plate-shape vacuum insulation material 11 is heat treated by a local heating device such as a plate heater, forced into a certain shape after softening a portion subject to bending only, and then cooled at 5–10° C. for 30–60 minutes. Accordingly, the insulation material 32 deformed in a box-shape is resulted without using the inner and outer molds. However, the shape would be more accurately fixed if a mold is used. Here, forming the notched groove 15 on the plate-shape vacuum insulation material 11 results in a thin local portion, thereby reducing the quantity of heat necessary for softening and bending.

For example, a notched groove formed on the section of the plate-shape vacuum insulation material 11 subject to bending is locally thinned, thereby enabling deformation into a shape fittable with a box even at room temperature.

Foaming a rigid polyurethane foam as a backup material together with the deformed vacuum insulation material 11, the deformed vacuum insulation material becomes more rigid, thereby improving the insulatability. For instance, a vacuum insulation material is deformed inbetween an insulation cavity between an inner case and an outer case of a cold-box, into which a polyurethane foam is injected to foam the same, thereby fixing the vacuum insulation material in the insulation cavity improving the cold-box insulatability.

A freezing and refrigerating equipment and insulation container utilizing a vacuum insulation material offering excellent insulation efficiency will be explained in detail hereinafter.

<A> Necessity of the Combination of Peltier Element and Vacuum Insulation Material Because of the problem of ozone depletion, use of a various cooling systems utilizing fluorocarbon is reconsidered. Depending upon the future demand, opportunities for the use of Peltier element in the cooling system may be increased. That is, Peltier element, a thermoelectric conversion element, because of its endothermic reaction, may be employed and applied in an apparatus such as a refrigerator without utilizing the fluorocarbon in the cooling system by a compressor, etc. Further, the freezing and refrigerating container means a container having freezing or refrigerating functions.

The use of Peltier element (1) eliminates a problem of noise, (2) does not require the use of fluorocarbon, (3) downsizes the container, and (4) allows precise temperature control. However, the Peltier element has a small coefficient of performance (hereinafter COP), which makes a transition from the cooling temperature range to the freezing temperature range extremely difficult. An object of this invention is to increase the capacity of refrigerating container using the Peltier element in combination with the vacuum insulation panel while taking into account of insulatability of the conventional rigid polyurethane foam without a substantial change in its design. Not only low costs but also cost performance is essential in consideration of the current price range, and unless these problems are overcome, it is impossible to put the container to practical use. The present invention employs vacuum insulation panels of low cost and high performance and overcome these problems.

<B> Examples and Comparative Example Using Peltier Element

Figure 9:
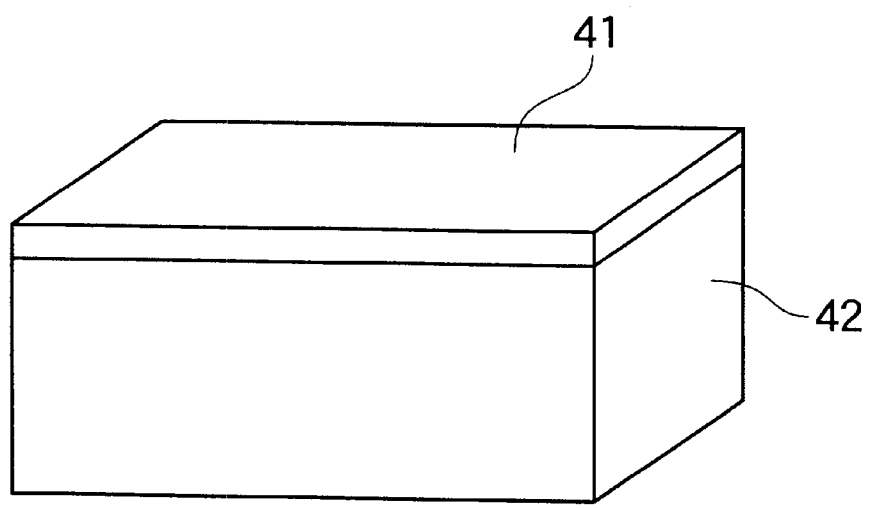
FIG. 9 is an explanatory view of a cabinet.
Figure 10:
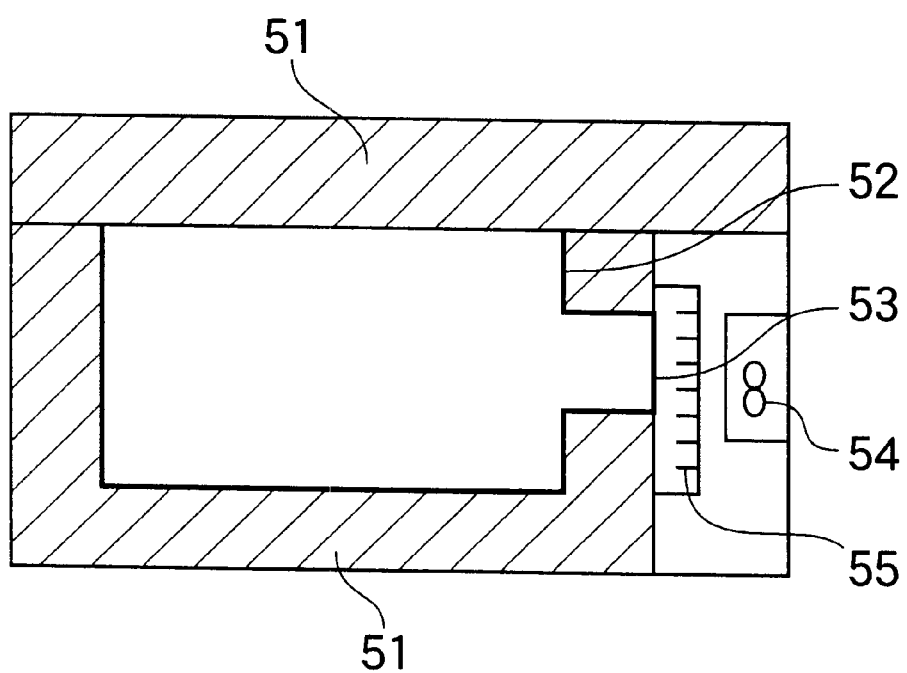
FIG. 10 is an explanatory view of a freezing and refrigerating container with a Peltier element.

In an effective content volume (18L)-class refrigerated box, the cooling system employs the Peltier system and uses a Peltier element (F-44-HP, 12 V-5 A-60 W, manufactured by Fligister), an aluminum skived fin as a radiating fin, and a propeller fan. Further, an aluminum container is used as an inner surface, thereby employing a heat exchange method by heat conduction. FIG. 9 shows the outer appearance view while FIG. 10 shows the cross-section view. As a power source, an AC100 V converter was used. The container shown in FIG. 9 is a cabinet whose outer side and inner side are made of polypropylene (2 mm), inside dimensions are 300×300×200 (mm), and insulation thickness is 30 mm.

The insulating section utilizing a vacuum insulation material is a box section without a lid, and the insulating section is designed to be a composite panel obtained by combining the vacuum insulation material with a rigid polyurethane portion, as a conventional heat insulation material, thereby changing the average heat conductivity. The usability of the existing design specification without making any design change was examined using one Peltier element and applying electric power 100 W or smaller.

The term "conventional heat insulation material" used herein means heat insulation materials other than the vacuum insulation panel, consisting of materials such as glass wool and urethane foam.

For the performance evaluation, the following criterion was established: That is, the temperature of the container should reach -5° C. within 5 hours. The purpose of setting this criterion is to set the temperature within the zone in which ice does not melt. When establishing the insulation specification, the importance of cost performance was considered so as to attain the best results at lower cost since the vacuum insulation materials are costly.

Figure 11:
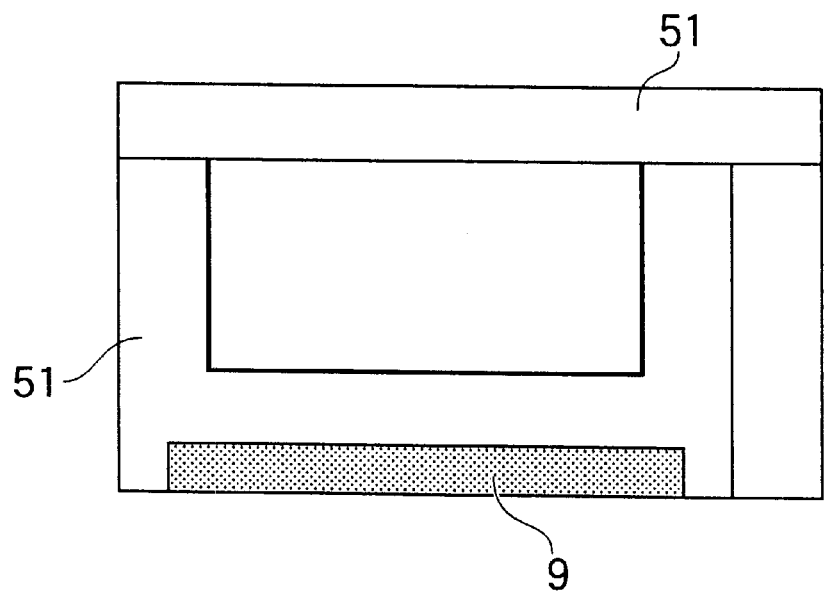
FIG. 11 is an explanatory view of a freezing and refrigerating container having a vacuum insulation panel at a bottom.
Figure 12:
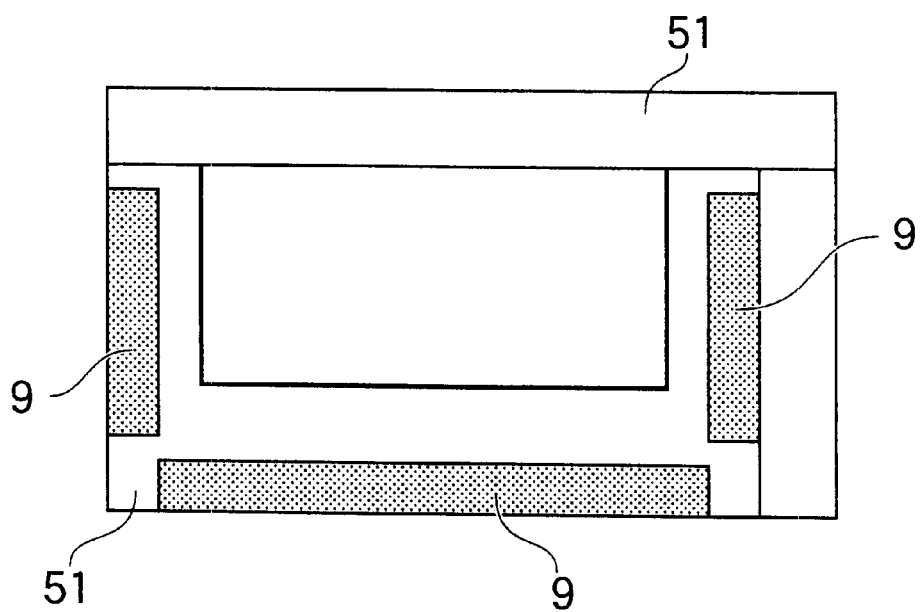
FIG. 12 is an explanatory view of a freezing and refrigerating container having a vacuum insulation panel at a bottom and front and back of the Peliter element.
Figure 13:
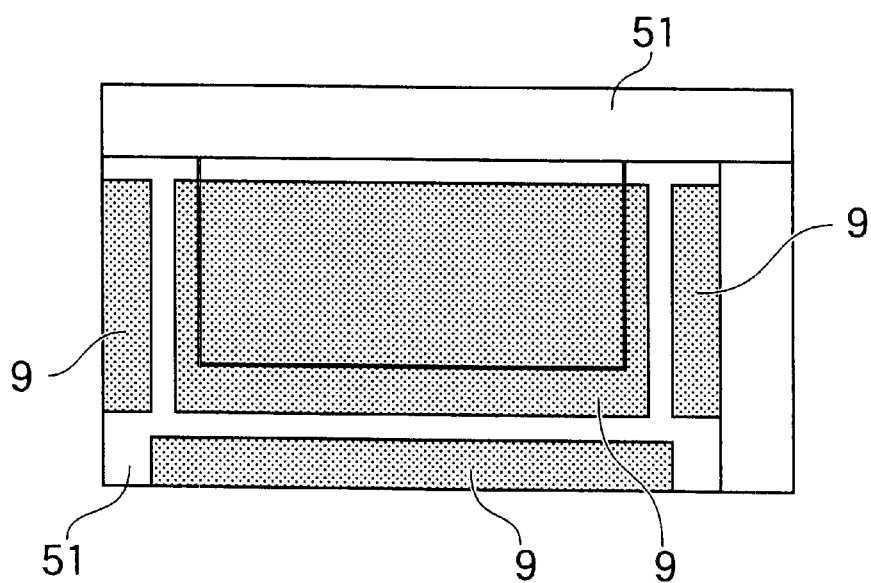
FIG. 13 is an explanatory view of a freezing and refrigerating container having a vacuum insulation panel at a bottom, front and back of the Peliter element, and right and left.
Figure 14:
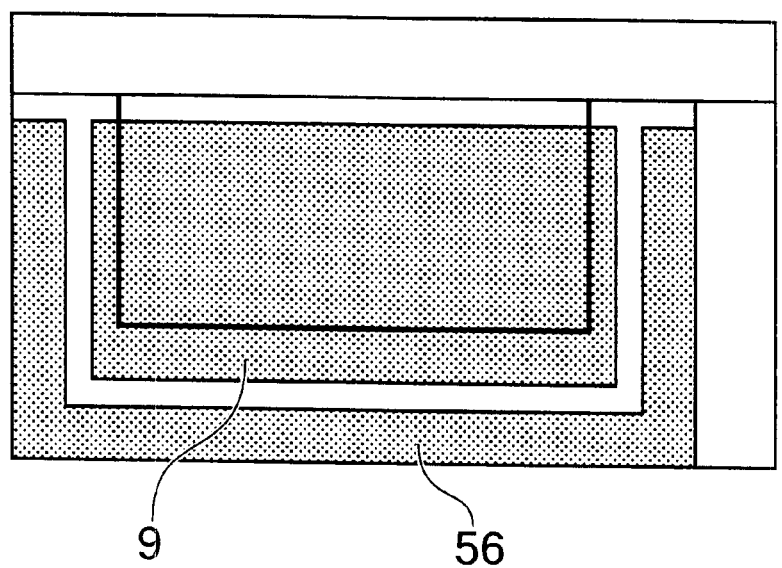
FIG. 14 is an explanatory view of a freezing and refrigerating container having a vacuum insulation panel on a surface integrally formed among a bottom and front and back of the Peliter element and on right and left.

As a composite insulating panel, the conventional insulating panel thickness (urethane thickness of 30 mm) was used as a base, and urethane thickness of 15 mm and the vacuum insulation panel of 15 mm were used. The installation of the vacuum insulation panel was carried out as follows: on the bottom of the box portion other than the lid portion, the front and back sides relative to the Peltier element and the right and left sides relative to the Peltier element, the vacuum insulation panel was put only on the bottom as shown in FIG. 11 (specification 1); on the bottom and on the front and back sides relative to the Peltier element as shown in FIG. 12 (specification 2); on the bottom, on the front and back sides relative to the Peltier element and on the right and left sides relative to the Peltier element as shown in FIG. 13 (specification 3); and the vacuum insulation panel integrally formed for the bottom and front and back sides relative to the Peltier element was used and at the same time the vacuum insulation panel was put on the right and left sides relative to the Peltier element as shown in FIG. 14 (specification 4). In each case, the panels were put on the outside surface of the box. The urethane foam used was a rigid polyurethane a foam (density 30 kg/m³, λ0.016 kcal/mh° C.). The vacuum insulation material used was a panel consisted of a core material, open-celled rigid urethane foam, and an aluminum laminated packaging material, and the density was 120 kg/m³ and λ was 0.0035 kcal/mh° C.

Thus, the calculated average heat conductivity of each of the 4 specifications was about 0.014 kcal/mh° C. for the specification 1, about 0.011 kcal/mh° C. for the specification 2, about 0.006 kcal/mh° C. for the specification 3, and about 0.006 kcal/mh° C. for the specification 4. As a standard, the insulation material consisting of a rigid polyurethane foam only was used.

The area of each vacuum insulation portion for installing the vacuum insulation panel was set in such a manner that the cover rate of the panel was 70% of each outside area.

Figure 15:
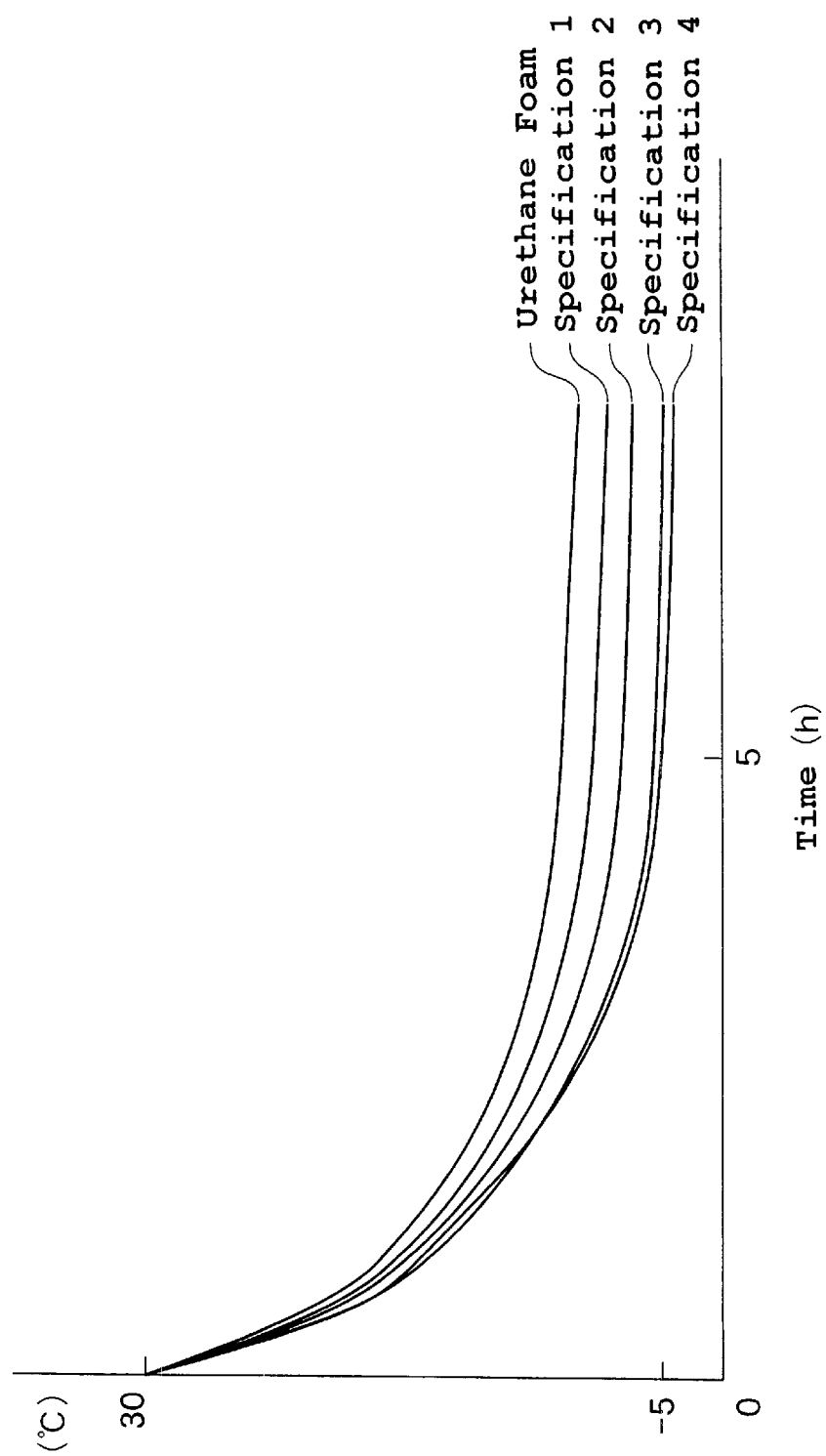
FIG. 15 is a graph showing the characteristics of cooling urethane foam and its specification 1–4.

FIG. 15 shows the cooling performance characteristics of the containers of the specifications 1 to 4 (the test environment was 30° C.×65%RH). As such, the containers which can reach -5° C. within 5 hours under ambient temperature of 30° C. are those of the specifications 3 and 4, and it was found that at least the average heat conductivity must be 0.006 kcal/mh° C. or lower.

Since the container in the specification 4 used a vacuum insulation panel integrally formed for the bottom and the front and back sides of the Peltier element, there was no heat leak due to heat bridge, and the cooling performance was improved.

It may be understood that in cases where only one Peltier element is used, the criterion cannot be satisfied with the performance of the conventional heat insulation materials such as a urethane foam. The criterion can be satisfied if multiple Peltier elements are used or elements having a high coefficient of performance are used; however, the costs are increased and the consumption of electricity becomes 100 W or higher, accordingly, the lack of battery capacity, for example, in the ordinary cars, is expected. Thus, practical use of such containers is very difficult. Accordingly, with the conventional urethane foam in combination with the vacuum insulation panel without any design change, this invention offers a freezing and refrigerating box whose average heat conductivity is 0.006 kcal/mh° C. or lower preventing ice from melting.

Based on the above results, the amount of heat leak in the above box was calculated, which shows that, unless the amount of heat leak obtained from the equation below is 3.5 W or less, the heat exchange cooling system employing a heat conduction method, in which only one Peltier element (4 cm×4 cm module) is used, cannot reach -5° C. within 5 hours. In order to reduce the cooling temperature of the refrigerated box based on these results, the design of the box can be modified or changed in the future: for example, the consumption of electric power will be controlled by arranging multiple Peltier elements not in series but in parallel, and the installation space of the Peltier element will be further devised. In any case, those modifications and changes should be made within the limits of not deteriorating the merits of the Peltier element, such as light weight, compactness, less noise.

Equation 1

Amounto of Heat Leak:

$$Q = \frac{\lambda}{d}(T_1 - T_2)S$$

λ=Heat Conductivity(kcal/mh° C.)
d=Insulating Thickness
S=Area(m²)
$T_1$=Temperature of Outside Air(° C.)

If the average heat conductivity is 0.006 kcal/mh° C. or higher, it is possible to increase the thickness of the vacuum insulation material and decrease the number of the vacuum insulation materials installed.

In cases where the refrigerated box is used in combination with a cold reserving agent, even if the power supply is shut off, its cold insulation can be expected to continue for 4 to 5 hours, though further cooling effect will be not exhibited. Furthermore, the use of Peltier elements enables not only cold insulation, but also hot insulation if its polarity is switched. In this case, the same effect as above can be expected.

Industrial Field of the Application

The present invention has the flowing advantages.

<A> It is an object of this invention to facilitate a deformation of plate-shape vacuum insulation materials into a shape having curvature.

<B> It is another object of this invention to provide an insulation container with excellent insulation effect having curvature deformed plate-shape vacuum insulation.

<C> It is another object of this invention to provide an excellent freezing and refrigerating container utilizing a Peltier element and a vacuum insulation material.

What is claimed is:

1. A method of deforming a vacuum insulation material, comprising steps of inserting a thermoplastic open-celled rigid foam as a core material into a packet composed of a gas barrier film, evacuating and sealing the packet so as to produce a vacuum insulation material, heating and softening the vacuum insulation material so as to deform the same, and cooling the vacuum insulation material so as to cure the same.

2. The method of deforming a vacuum insulation material according to claim 1, wherein the method further comprises steps of inserting the vacuum insulation material in a heating furnace so as to soften the same, deforming the vacuum insulation material to be positioned in a mold, placing the deformed vacuum insulation material in the furnace, and cooling the deformed vacuum insulation material so as to cure the same.

3. The method of deforming a vacuum insulation material according to claim 1, wherein the method further comprises steps of forming a notched groove on the core material and heating around the notched groove so as to deform the vacuum insulation material.

4. The method of deforming a vacuum insulation material according to claim 1, wherein the open-celled rigid foam is an open-cell rigid polyurethane foam or an open-celled rigid polystyrene foam.

5. The method of deforming a vacuum insulation material according to claim 1, wherein the open-celled rigid foam is an open-cell rigid polyurethane foam and is about 0.55–0.95 in terms of equivalent ratio of NCO/OH.

6. The method of deforming a vacuum insulation material according to claims 1–5, wherein the open-celled rigid foam is an open-cell rigid polyurethane foam and a means for performing the foam molding comprises the following steps (A)-(C):

(A) steps of mixing foaming components and pouring the foaming components into a chink where said mixed foaming components are produced to freely rise the same;

(B) a step of compressing the foam during the free foaming step of (A) before the gel time, i.e., a first compression step, and (C) a step of compressing the compressed foam obtained in the step of (B) before the rise time, i.e., a second compression step.

7. The method of deforming a vacuum insulation material according to claim 1, wherein said vacuum insulation material is covered by metallic or plastic film.

8. The method of deforming a vacuum insulation material according to claim 1, wherein said vacuum insulation material is dipped into organic polymer solution to be coated thereon.

9. A method of deforming a vacuum insulation material, comprising steps of forming a notched groove on a surface of the core material of the open-celled rigid foam, inserting the same into a packet composed of a gas barrier film, evacuating and sealing the container so as to produce a vacuum insulation material, and deforming around the notched groove of the core material.

10. A method of fixing vacuum insulation material, comprising steps of placing a deformed vacuum insulation material on an insulating section of a container, pouring a rigid polyurethane foaming components comprising a polyol component, an isocyanate component, and a blowing agent into a cavity of the insulating section to foam, and fixing the vacuum insulation material on the insulating section.

11. A freezing and refrigerating apparatus, comprising a vacuum insulation material, obtained through steps of inserting a core material in a packet composed of a gas barrier film and evacuating and sealing the same, and a Peltier element.

12. A freezing and refrigerating apparatus, comprising a vacuum insulation material, obtained through steps of inserting a core material in a packet composed of a gas barrier film and evacuating and sealing the same, a general vacuum insulation material, and a Peltier element.

13. A freezing and refrigerating apparatus, wherein a deformed vacuum insulation material, obtained through steps of inserting a thermoplastic open-celled rigid foam as a core material into a packet composed of a gas barrier film, evacuating the packet to seal the same, is placed on an insulating section of the container; an insulation material such as a rigid polyurethane foam is inserted into a chink of the insulating section; and a Peltier element is utilized as a cooler.

14. An insulation container having an insulation material around the containing space, wherein said insulation material is a vacuum insulation material in which an open-celled rigid foam formed to a skin layer is covered by a gas barrier film to vacuumize the inside.

15. The insulation container according to claim 14, wherein the vacuum insulation material is a deformed vacuum insulation material obtained by deforming a plate-shape vacuum insulation material in conformity with a circumferential surface of the containing space.

16. An insulation container having an insulation material around the containing space, wherein said insulation material is a deformed vacuum insulation material in which an open-celled rigid foam is covered by a gas barrier film to evacuate the inside and said vacuum insulation material is heated to be softened to deform in conformity with the circumferential surface of the containing space and cooled to cure the same.

17. The insulation container according to one of claims 14–16, wherein a Peltier element is inserted into the insulation container to act as a cooling container to cool the containing space.

18. A method for manufacturing an insulation container having an insulation material around the containing space, wherein said method further comprises steps of freely rising foaming components comprising a polyol component, an isocyanate component, and a blowing agent, compressing said foaming components before the gel time, further compressing the same before the rise time, forming a rigid polyurethane foam having an open cell content of not less than 99% in a state that the obtained skin layer is left as it is, covering the rigid polyurethane foam with a gas barrier film, evacuating the inside to produce the vacuum insulation material, heating and softening the vacuum insulation material to deform the same, and having the cooled and cured vacuum insulation material around the containing space.

19. A method for manufacturing an insulation container having an insulation material around the containing space, wherein said insulation material is a deformed vacuum insulation material in which an open-celled rigid foam is covered by a gas barrier film to evacuate the inside and said vacuum insulation material is heated to be softened to deform in conformity with the circumferential surface of the containing space and cooled to cure the same.

20. A method for manufacturing an insulation container having an insulation material around the containing space, wherein said insulation material is a deformed vacuum insulation material in which an open-celled rigid foam foam is covered by a gas barrier film to evcuate the inside; a notched groove is formed on a core material of the vacuum insulation material in conformity with a shape of the containing space; the core material around the notched groove is deformed in conformity with the circumferential surface of the containing space to obtain the deformed vacuum insulation material; and said deformed vacuum insulation material is positioned around the containing space.

* * * * *